July 16, 1957 L. J. MODEWEG 2,799,121

PLANT IRRIGATING DEVICE

Filed June 2, 1955

INVENTOR.
Leslie J. Modeweg.
BY
Harness, Dickey & Pierce
ATTORNEYS.

United States Patent Office 2,799,121
Patented July 16, 1957

2,799,121

PLANT IRRIGATING DEVICE

Leslie J. Modeweg, Ludington, Mich.

Application June 2, 1955, Serial No. 512,681

3 Claims. (Cl. 47—38)

This invention relates to irrigating devices and, more particularly, to an improved device for irrigating potted plants and the like.

An object of the invention is to overcome disadvantages in prior devices of the indicated character and to provide an improved plant irrigating device which facilitates the controlled irrigation of potted plants and the like from a central reservoir.

Another object of the invention is to provide an improved plant irrigating device incorporating improved means for controlling the rate of flow of fluid therethrough.

Another object of the invention is to provide an improved plant irrigating device which facilitates the irrigation of potted plants and the like for relatively long periods of time without requiring the intermittent presence of the user.

Another object of the invention is to provide an improved plant irrigating device that is economical to manufacture and assemble, durable, efficient and reliable in operation.

Another object of the invention is to provide an improved plant irrigating device which is adapted to simultaneously irrigate and fertilize a plurality of separately potted plants and the like at any desired rate within the capacity of the device.

Another object of the invention is to provide an improved plant irrigating device which facilitates the application of controlled amounts of water and fertilizer to potted plants and the like without flooding or drowning the plants and without wetting the leaves thereof.

Another object of the invention is to provide an improved plant irrigating device which facilitates the watering of potted plants and the like from below the surface of the surrounding earth.

Another object of the invention is to provide an improved plant irrigating device which facilitates irrigating and fertilizing a plurality of separately potted plants with a minimum of time and labor on the part of the user.

The above as well as other objects and advantages of the present invention will become apparent from the following description, the appended claims and the accompanying drawing wherein:

Figure 1:
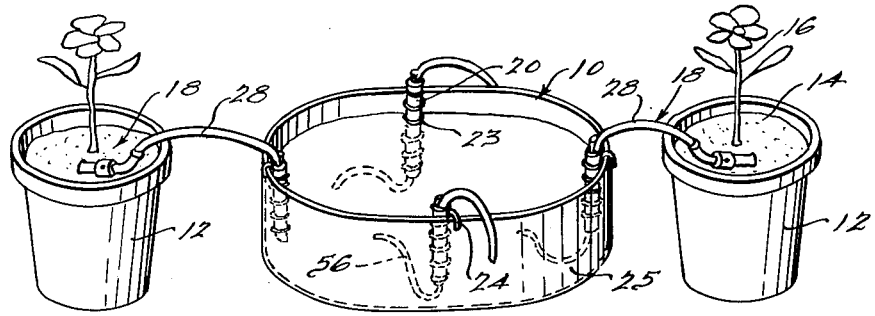
Figure 1 is a perspective view of a plurality of plant irrigating devices embodying the present invention, showing the same in installed relationship with respect to a plurality of separately potted plants.

Referring to the drawing, a central reservoir, generally designated 10, is illustrated which is adapted to retain a supply of water for irrigating a plurality of plants. A plurality of pots 12 are also illustrated which are disposed in spaced relationship around the periphery of the reservoir 10, each of the pots 12 having earth 14 or other suitable material therein in which is planted a plant 16.

The present invention is particularly adapted to transfer fluid from the reservoir 10 to the pots 12 at a controlled rate so as to wet the earth 14 and irrigate the plants 16. In accordance with the present invention, a plant irrigating device, generally designated 18, is provided. The device 18 includes a tubular member 20 which may be formed of plastic, metal, or other suitable material. A spring clip 22 is provided having a coiled portion 23 which encompasses the tubular member 20 and a hook portion 24 which is adapted to fit over the upper edge of the peripheral wall 25 of the reservoir 10 and hold the tubular member 20 in a substantially vertical position within the reservoir 10. The tubular member 20 defines a bore 26 which is open at each end and through which a wick 28 extends. In the preferred embodiment illustrated, the wick 28 is shown as being formed of extruded cellulose sponge 30 although it will be understood that other materials may be utilized. It is preferred that the capillary attraction of the wick 28 be relatively high when the wick is in contact with water.

A generally wedge-shaped control member 34 is provided which is adapted to be inserted in the bore 26 of the tubular member 20 at one end thereof, the control member 34 serving to constrict the bore 26 and limit the expansion of the wick 28 when wet. By moving the control member 34 longitudinally of the bore 26 of the tubular member 20, the cross sectional dimensions of the bore 26 may be varied so as to variably limit the expansion of the wick and the rate of flow of water longitudinally thereof.

Figures 2, 3:
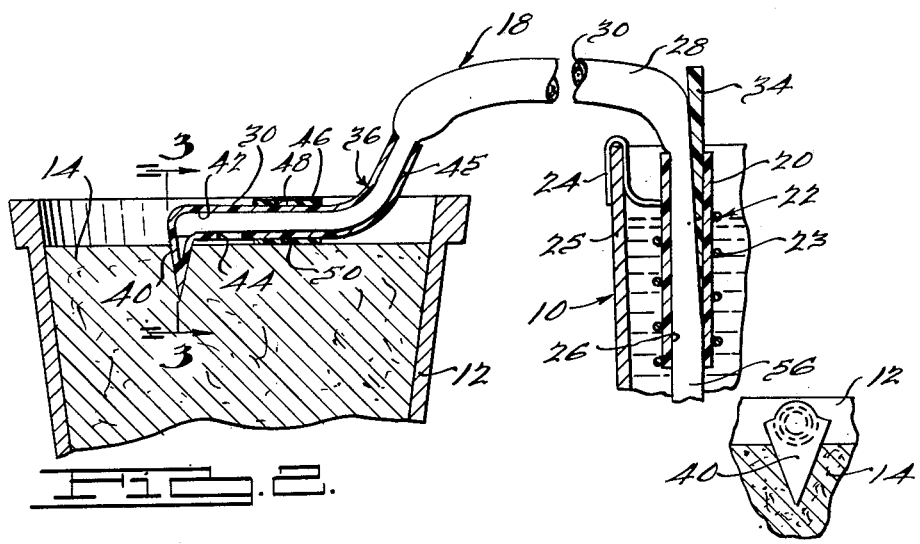
Fig. 2 is a sectional side elevational view of a portion of the structure illustrated in Fig. 1, showing the plant irrigating device in one operative position.
Fig. 3 is an end view of a portion of the irrigating device illustrated in Fig. 2, taken on the line 3—3 thereof.
Figure 4:
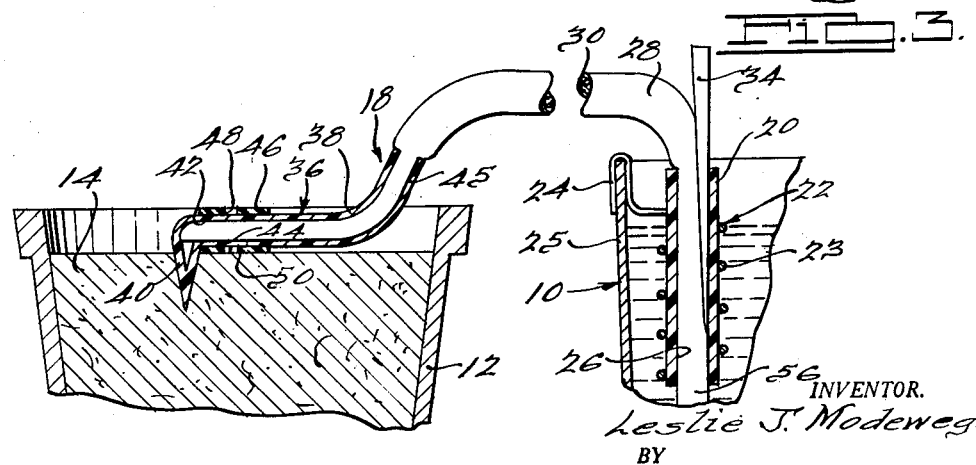
Fig. 4 is a view similar to Fig. 2 and showing the plant irrigating device in another operative position.

A nozzle member generally designated 36 is provided which may be formed of plastic, metal or other suitable material. The nozzle member 36 includes a body portion 38 and a head portion 40 integrally joined to the body portion 38. The head portion 40 tapers outwardly in a direction substantially perpendicular to the longitudinal axis of the body portion 38 and is adapted to be inserted in the earth surrounding the plant so as to hold the body portion in contact with the earth. The body portion 38 defines a longitudinally extending bore 42 having an outlet opening 44 at a position near, but spaced from, the head portion 40, and the end section 45 of the body portion remote from the head portion 40 curves angularly upwardly, as viewed in Figs. 2 and 4. The opening 44 preferably opens downwardly, as viewed in Figs. 2 and 4, so as to be disposed in confronting relationship with respect to the upper surface of the earth.

A sleeve member 46 is provided which is mounted on the body portion 38, the sleeve member 46 preferably being formed of rubber or other resilient material and snugly fitting the body portion 38. The sleeve member 46 defines a plurality of radially extending passageways 48 and 50 which are adapted to be selectively aligned with the opening 44, in the body portion 38, the passageways 48 and 50 preferably being of smaller diameter than the opening 44 and the diameter of the passageway 50 preferably being smaller than the diameter of the passageway 48. The end portion 52 of the wick 28 is inserted in the bore 42 of the body portion 38 and terminates adjacent the head portion 40 of the nozzle member 38.

In the operation of the plant irrigating device, the head portion 40 of the nozzle member 36 is inserted in the earth in the manner previously described and the tubular member 20 is inserted in the reservoir 10 so that the end portion 56 of the wick is disposed in the water, the hook portion 24 engaging the peripheral wall 25 of the reservoir 10 so that the tubular member 20 is held in a substantially vertical position and maintains the lower end portion of the wick below the surface of the water. When the wick is emerged in the water, the wick absorbs the water at a relatively rapid rate and the water flows through the wick by capillary attraction to the opposite end thereof. As the wick absorbs the water, the wick expands and the rate of flow through the wick may be controlled by limiting the expansion of the wick through the agency of the wedge-shaped control member 34, the rate of flow being adjusted by varying the axial position of the control member 34 in the bore 26 of the tubular member 20.

As is well known, various types of plants require varying amounts of water, and the application of excess water to certain plants may result in the death of such plants. Similarly, the addition of too little water to the plants will result in the death of the plants. The sleeve member 46 facilitates the accurate control of the rate of flow of water emerging from the nozzle member 36, the openings 48 and 50 being selectively aligned with the opening 44 in the body portion 38 so as to vary the cross sectional area of the opening through which the water flows from the wick to the earth. For example, if a minimum rate of flow is desired, the passageway 50 defined by the sleeve member 46 may be aligned with the opening 44 defined by the body portion 38 so as to constrict the outlet opening to the minimum desired cross sectional area, thereby reducing the rate of flow through the sleeve member 46 to the earth to a minimum. By aligning the passageway 48 with the opening 44, the rate of flow may be increased, and by sliding the sleeve member 46 longitudinally of the body portion 38 in a direction away from the head portion 40, the opening 44 may be entirely exposed so as to obtain the maximum rate of flow therethrough. Thus, the wedge-shaped control member 34 and the sleeve member 46 cooperate with the nozzle member 36 to enable the user to obtain any desired rate of flow to the potted plants.

If it is desired to fertilize the potted plants at the same time that the plants are irrigated, a water soluble fertilizer may be dissolved in the water in the reservoir, the fertilizer flowing through the wick 28, the bore 42, and the opening 44 in the nozzle member to the plant, in the manner previously described.

In the event it is desired to irrigate or fertilize the plants from below the surface of the surrounding earth, the nozzle member 36 and the sleeve member 46 may be buried in the earth so that the head portion 40 and substantially all of the body portion 38 are disposed below the upper surface of the earth while the end section 45 of the body portion preferably terminates above such surface of the earth to prevent the fluid from flowing directly to the earth while bypassing the nozzle member and sleeve member.

While a preferred embodiment of the invention has been shown and described, it will be understood that various changes and modifications may be made without departing from the spirit of the invention.

What is claimed is:

1. In a plant irrigating device, the combination comprising a nozzle member having a body portion defining a bore closed at one end, said body portion also defining an opening intermediate the ends thereof and communicating with said bore, a head portion integrally joined to said body portion and projecting angularly outwardly therefrom, a rotatable sleeve member encompassing said body portion of said nozzle member and defining a passageway alignable with the opening therein, and an elongate wick, said wick having a portion thereof disposed in said bore adjacent said opening.

2. In a plant irrigating device, the combination including a nozzle member defining a bore closed at one end, said nozzle member also defining an opening intermediate the ends thereof and communicating with said bore, an elongate tubular member spaced from said nozzle member, an elongate wick, said wick having a portion thereof disposed in said bore adjacent said opening and another portion thereof extending through said tubular member, and means carried by said tubular member for controlling the rate of flow of fluid through said wick.

3. In a plant irrigating device, the combination including a nozzle member defining a bore closed at one end, said nozzle member also defining an opening intermediate the ends thereof and communicating with said bore, a rotatable sleeve member encompassing a portion of said nozzle member and defining a plurality of passageways selectively alignable with said opening, a tubular member spaced from said nozzle member, an elongate wick, said wick having a first portion thereof disposed in said bore adjacent said opening and a second portion extending through said tubular member, and a generally wedge-shaped control member carried by said tubular member and actuable to vary the cross-sectional dimensions of said wick.

References Cited in the file of this patent

UNITED STATES PATENTS

| 668,767 | Bird | Feb. 26, 1901 |
| 1,453,401 | Mattson | May 1, 1923 |
| 1,620,277 | Myers | Mar. 8, 1927 |
| 2,491,124 | Martin | Dec. 13, 1949 |

FOREIGN PATENTS

| 1,024,483 | France | Jan. 10, 1953 |
| 1,061,015 | France | Nov. 25, 1953 |